G. D. SMITH.
Coal Scuttle.

No. 63,953. Patented April 16, 1867.

Witnesses:
E. N. Porter
J. Franklin Reigart

Inventor:
Gaston D. Smith

United States Patent Office.

GASTON D. SMITH, OF WASHINGTON, DISTRICT OF COLUMBIA.

*Letters Patent No. 63,953, dated April 16, 1867.*

IMPROVEMENT IN COAL-SCUTTLES.

The Schedule referred to in these Letters Patent and making part of the same.

TO ALL WHOM IT MAY CONCERN:

Be it known that I, GASTON D. SMITH, of the city of Washington, District of Columbia, have invented a new and useful Ash-Sifter and Coal-Scuttle combined; and I do hereby declare the following to be an exact description thereof, reference being had to the accompanying drawings, and to the letters of reference marked thereon, making a part of this specification, in which—

Figure 1:
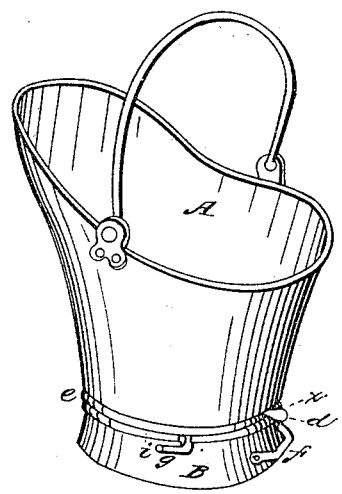
Figure 1 represents a perspective view of the sifter and scuttle combined.
Figure 2:
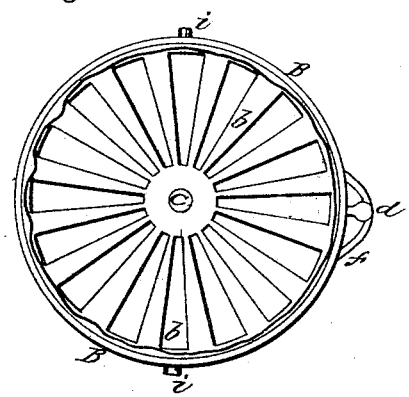
Figure 2 shows the sifter.
Figure 3:
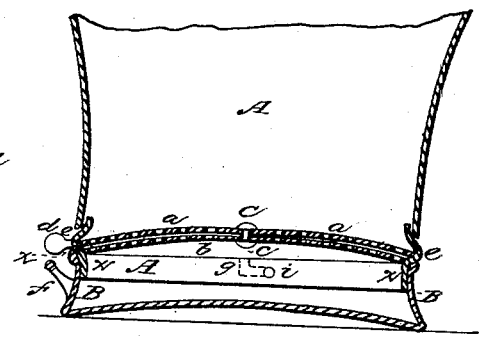

Figure 3, a sectional elevation.

The nature of my invention consists in the arrangement and construction of the radial apertures as an adjustable and movable sifter, operating in a channel of the scuttle, the sifter being convex at top, and of double disks, the lower disk stationary, and the upper one movable by means of an outside handle, but the lower disk may be made movable, if deemed necessary, or the disks may be perforated instead of the radial apertures or slots; also a collar below the sifter, to which the bottom (that is movable) is attached and adjusted. The disks fit each other, and are connected by a centre pivot, upon which the upper disk revolves.

A represents an ordinary coal-scuttle. B is the movable bottom or ash-pan that has a slot, $g$, at each side, in which the pin $i$ (on the collar $x$) fits. $e$ is a groove or channel in which the sifter or disks $a$ and $b$ fit, and operate by the handle $d$. $f$ is a handle attached to the ash-pan, for putting on or removing the pan when full of dust. C is the centre rivet, as a pivot upon which the upper disk revolves. The scuttle can be made of any suitable material, and the advantage is economy and preventing the dust from scattering about, the scuttle saving the coal, and the ash-pan the dust or ashes. The sifter or bottom plates $a$ and $b$, and the collar $x$, are made of malleable cast iron.

I am aware that it is not novel to place sieves or perforated bottoms in a coal-scuttle, and also that the bottoms are sometimes made of plates having slots or openings intermediate, so as to be opened and closed by oscillation of one of the plates, and that supplemental boxes for ashes, &c., are sometimes used. I claim none of these broadly, but what I do claim as my invention, and desire to secure by Letters Patent, is—

The perforated malleable cast-iron bottom plates $a$ $b$ and collar $x$ of a coal-hod, provided with an ash-box B, attached to it by a bayonet joint, when the same is constructed and arranged as and for the purpose set forth.

GASTON D. SMITH.

Witnesses:
E. N. PORTER,
J. FRANKLIN REIGART.